United States Patent
Takada

(10) Patent No.: US 10,785,070 B1
(45) Date of Patent: Sep. 22, 2020

(54) SEMICONDUCTOR INTEGRATED CIRCUIT AND RECEIVING APPARATUS

(71) Applicant: Kioxia Corporation, Minato-ku (JP)

(72) Inventor: Shuichi Takada, Yokohama (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 16/787,130

(22) Filed: Feb. 11, 2020

(30) Foreign Application Priority Data

Sep. 18, 2019 (JP) .................................. 2019-169680

(51) Int. Cl.
*H04L 27/10* (2006.01)
*H04L 25/03* (2006.01)
*H04L 7/033* (2006.01)

(52) U.S. Cl.
CPC ...... *H04L 25/03057* (2013.01); *H04L 7/0337* (2013.01)

(58) Field of Classification Search
CPC .................. H04L 25/03057; H04L 7/0337
USPC ....... 375/233, 232, 231, 230, 229, 295, 219, 375/316
See application file for complete search history.

(56) References Cited

U.S. PATENT DOCUMENTS

| 8,391,425 | B2 | 3/2013 | Ino |
| 8,791,735 | B1 | 7/2014 | Shibasaki |
| 9,166,771 | B2 | 10/2015 | Shibasaki |
| 2014/0269881 | A1* | 9/2014 | He .................... H04L 25/03878 375/231 |

FOREIGN PATENT DOCUMENTS

| JP | 2011-003948 A | 1/2011 |
| JP | 2014-204234 A | 10/2014 |
| JP | 2015-084487 A | 4/2015 |

* cited by examiner

*Primary Examiner* — Zewdu A Kassa
(74) *Attorney, Agent, or Firm* — Oblon, McClelland, Maier & Neustadt, L.L.P.

(57) ABSTRACT

According to one embodiment, a semiconductor integrated circuit includes: an equalizer circuit; a decision circuit that decides a bit value of a data signal; a sampler unit including sampler circuits, the sampler circuits having different thresholds and electrically connected in parallel between the equalizer circuit and the decision circuit; a determination circuit that determines indexes indicating a degree of confidence of current output values from the sampler circuits based on the bit values of the data signals at different past timings; and an arithmetic circuit that computes scores for bit values that are candidates for a current data signal based on the determined indexes and current output values from the sampler circuits. The decision circuit selects one bit value from the candidate bit values using the scores.

20 Claims, 9 Drawing Sheets

| SECOND DECISION RESULT (J2) | FIRST DECISION RESULT (J1) | FIRST CONFIDENCE INDEX (CI1) | SECOND CONFIDENCE INDEX (CI2) | THIRD CONFIDENCE INDEX (CI3) |
|---|---|---|---|---|
| 1 | 0 | 4 | 2 | 5 |
| 0 | 0 | 4 | 3 | 6 |
| 0 | 1 | 4 | 5 | 2 |
| 1 | 1 | 4 | 6 | 3 |

FIG.8

| | ASSUMED TRAJECTORY ||||||| CONFIDENCE INDEX |
| | TL1 || TL2 || TL3 || |
| | EL1 | EL2 | EL3 | EL4 | EL5 | EL6 | |
| SECOND SAMPLING RESULT | 0 | 1 | 0 | 0 | 0 | 0 | 2 |
| FIRST SAMPLING RESULT | 1 | 1 | 1 | 0 | 0 | 0 | 4 |
| THIRD SAMPLING RESULT | 1 | 1 | 1 | 1 | 0 | 1 | 5 |
| 0 SCORE | 2 | 0 | 2 | 6 | 11 | 6 | |
| 1 SCORE | 9 | 11 | 9 | 5 | 0 | 5 | |
| CURRENT DECISION RESULT | 1 | | 1 | | | 0 | |

| | ASSUMED TRAJECTORY | | | | | | CONFIDENCE INDEX |
|---|---|---|---|---|---|---|---|
| | TL4 | | TL5 | | TL6 | | |
| | EI1 | EI2 | EI3 | EI4 | EI5 | EI6 | |
| SECOND SAMPLING RESULT | 0 | 1 | 0 | 0 | 0 | 0 | 3 |
| FIRST SAMPLING RESULT | 1 | 1 | 1 | 0 | 0 | 0 | 4 |
| THIRD SAMPLING RESULT | 1 | 1 | 1 | 1 | 0 | 1 | 6 |
| 0 SCORE | 3 | 0 | 3 | 7 | 13 | 7 | |
| 1 SCORE | 10 | 13 | 10 | 6 | 0 | 6 | |
| CURRENT DECISION RESULT | 1 | | 1 | | 0 | | |

FG2

SEMICONDUCTOR INTEGRATED CIRCUIT AND RECEIVING APPARATUS

CROSS-REFERENCE TO RELATED APPLICATIONS

This application is based upon and claims the benefit of priority from Japanese Patent Application No. 2019-169680, filed on Sep. 18, 2019; the entire contents of which are incorporated herein by reference.

FIELD

Embodiments described herein relate generally to a semiconductor integrated circuit and a receiving apparatus.

BACKGROUND

Conventionally, in a communication system, there is a case where wired communication is performed by connecting a transmitting apparatus and a receiving apparatus via a wired communication path. In the receiving apparatus, it is desired to reduce the bit error rate.

BRIEF DESCRIPTION OF THE DRAWINGS

FIG. 8 is a diagram illustrating examples of first to third sampling results, 0 score, 1 score, and a decision result at the present time in the transition illustrated in FIG. 6 according to the embodiment;

FIG. 9 is a diagram illustrating examples of the first to third sampling results, 0 score, 1 score, and a decision result at the present time in the same transition illustrated in FIG. 7 according to the embodiment;

DETAILED DESCRIPTION

In general, according to one embodiment, a semiconductor integrated circuit including an equalizer circuit, a decision circuit, a sampler unit, a determination circuit, and an arithmetic circuit. The decision circuit is configured to decide the bit value of a data signal. The sampler unit includes a plurality of sampler circuits having a plurality of different thresholds and electrically connected in parallel between the equalizer circuit and the decision circuit. The determination circuit is configured to determine a plurality of indexes indicating the degree of confidence of a plurality of current output values from the plurality of sampler circuits based on bit values of the data signals at a plurality of different past timings. The arithmetic circuit is configured to compute scores for a plurality of bit values that are candidates for a current data signal based on the plurality of determined indexes and the plurality of current output values from the plurality of sampler circuits. The decision circuit is further configured to select one bit value from the plurality of candidate bit values using the scores.

The semiconductor integrated circuit according to the embodiments will be described in detail below with reference to the accompanying drawings. Note that the present invention is not limited to these embodiments.

Embodiments

Figure 1:
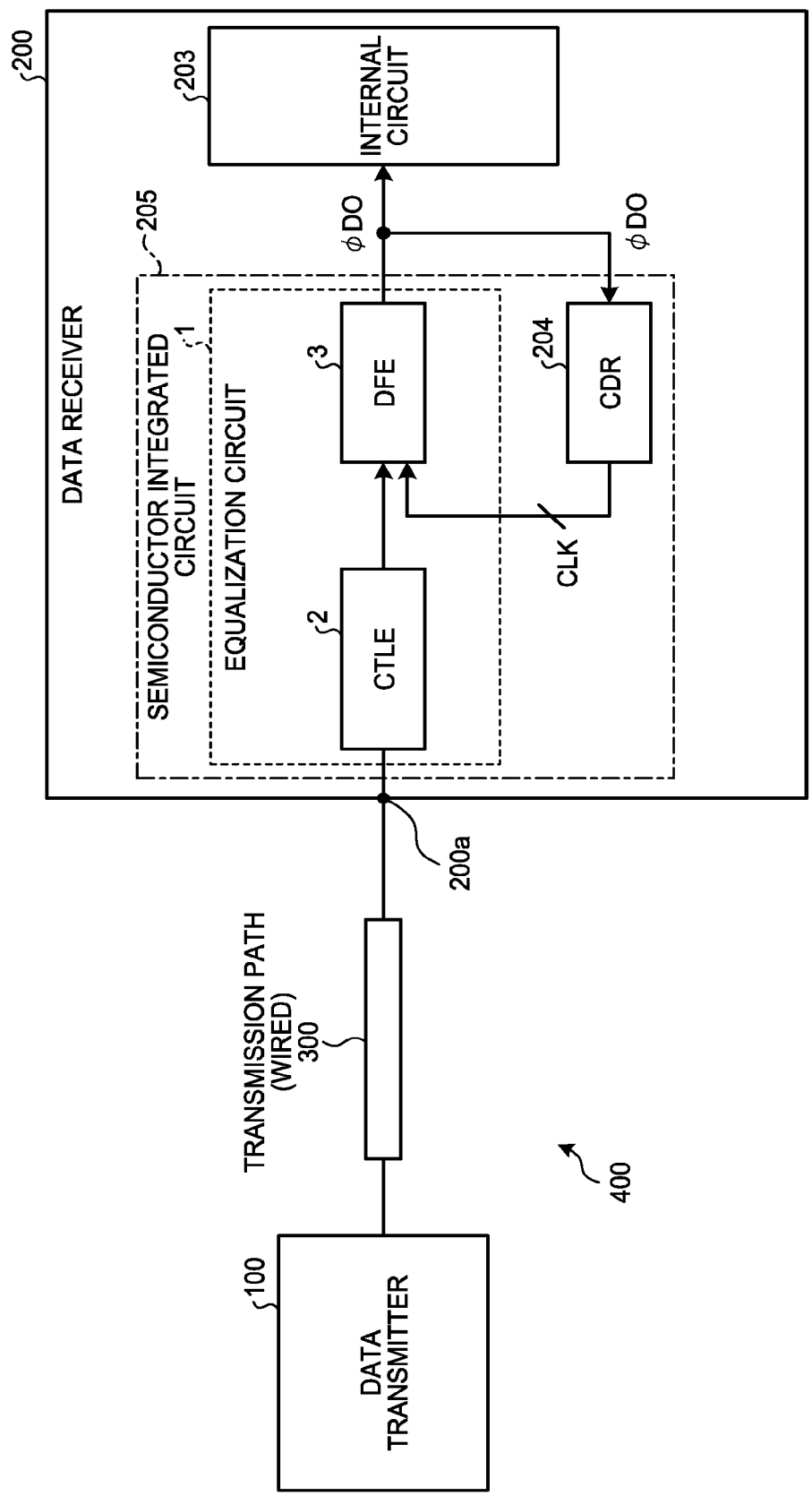
FIG. 1 is a diagram illustrating a configuration of a communication system including a data receiver having an equalization circuit in an embodiment.

A data receiver 200 provided with a semiconductor integrated circuit 205 according to the embodiments will be described with reference to FIG. 1. FIG. 1 is a diagram illustrating a configuration of a communication system 400 including the data receiver 200 having an equalization circuit 1.

The communication system 400 has a data transmitter 100, the data receiver 200, and a wired communication path 300. The data transmitter 100 and the data receiver 200 are communicably connected via the wired communication path 300 that is a transmission path. The data transmitter 100 transmits signals to the data receiver 200 via the wired communication path 300. That is, the data receiver 200 has a reception node 200a to which the wired communication path 300 can be connected, and can receive signals from the data transmitter 100 via the wired communication path 300.

The data transmitter 100 is a transmitting apparatus that transmits a signal obtained by applying predetermined modulation (for example, binary modulation such as NRZ or pulse amplitude modulation <PAM>) to a signal to be transmitted to the data receiver 200 via the wired communication path 300. The data receiver 200 is a receiving apparatus having the semiconductor integrated circuit 205 and an internal circuit 203. The semiconductor integrated circuit 205 has an equalization circuit 1 and a CDR (Clock Data Recovery) circuit 204. The equalization circuit 1 is electrically connected to the reception node 200a.

The equalization circuit 1 uses a clock CLK supplied from the CDR circuit 204 to equalize an input signal supplied via the reception node 200a, restores data φDO, and outputs the data φDO to the CDR circuit 204 and the internal circuit 203. The CDR circuit 204 reproduces the clock CLK from the data φDO. The CDR circuit 204 supplies the reproduced clock CLK to the equalization circuit 1. Thus, the equalization circuit 1 again equalizes a waveform of the input signal using the clock CLK supplied from the CDR circuit 204. That is, the accuracy of the equalization by the equalization circuit 1 affects an accuracy of the reproduction of the clock CLK by the CDR circuit 204.

In wired communication, a data rate becomes higher and communication at a higher frequency is performed. In the wired communication with a high data rate, a differential signal may be transmitted. In the wired communication path 300, because of channel loss due to the skin effect of a conducting wire, dielectric loss, or the like, a loss of signal strength in a transmission signal tends to be larger in high frequency components than in low frequency components.

That is, as a communication speed increases, a waveform of the signal after passing through the wired communication path 300, that is, the waveform of the transmission signal may be greatly distorted due to an influence of inter-symbol interference (ISI). An equalizer technique is present for correcting such waveform distortion of signals. Under constraints of the process, area, and power of the semiconductor that constitutes the equalizer, a performance of the equalizer itself is reaching its limit. Further, simply increasing a gain of the equalizer also amplifies signal noise and device noise of a circuit itself, so there is a limit to increasing the gain itself. For this reason, it is difficult to obtain a reliable eye opening on a receiving side, and it becomes difficult to reduce the bit error rate (hereinafter referred to as BER) of a signal whose waveform is distorted.

Figure 2:
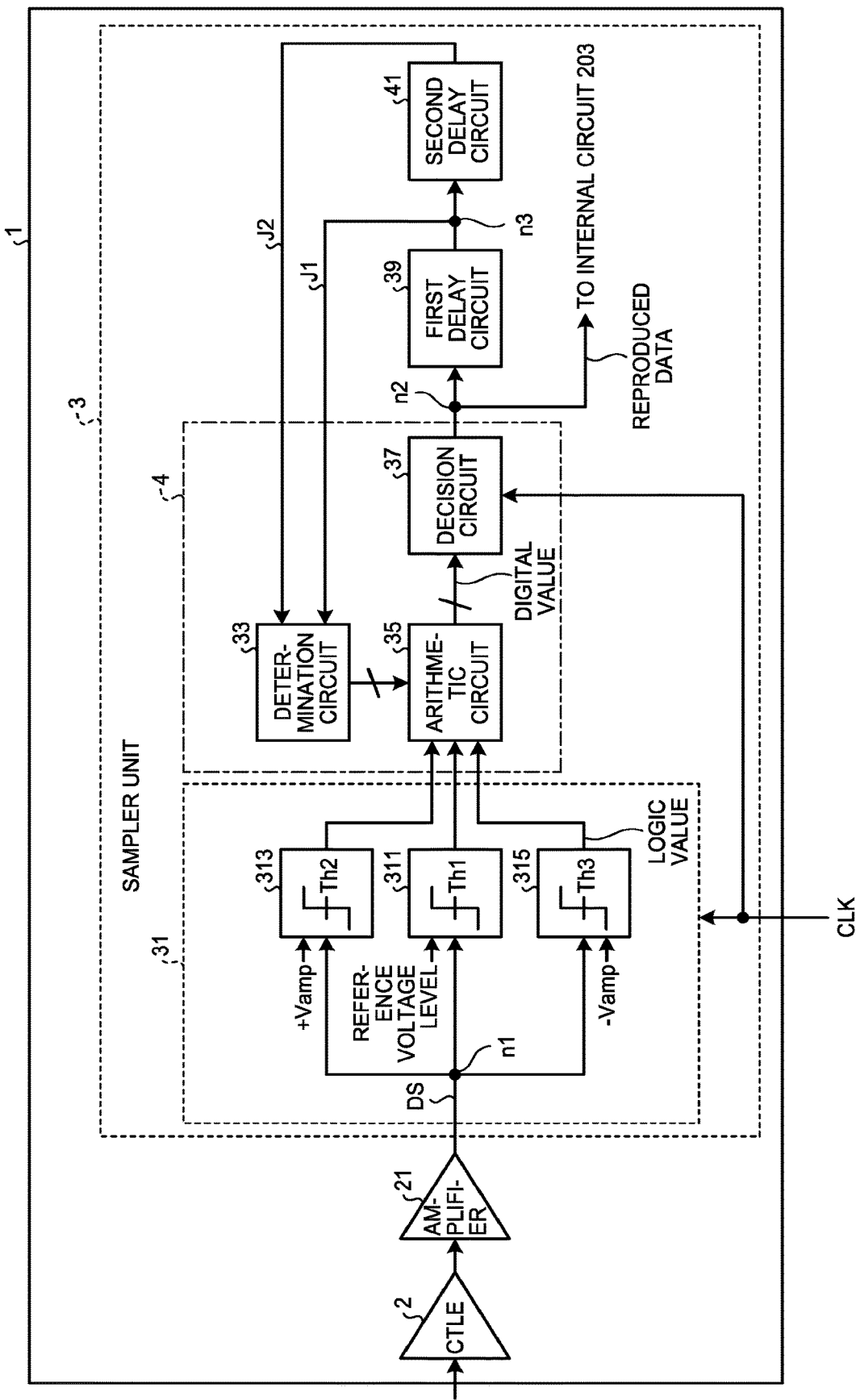
FIG. 2 is a diagram illustrating an example of a configuration of the equalization circuit in the embodiment.

FIG. 2 is a diagram illustrating an example of a configuration of the equalization circuit 1. The equalization circuit 1 has a continuous time linear equalizer (CTLE) 2 corresponding to the equalizer circuit, an amplifier (Sum) 21, and a decision feedback equalizer (DFE) circuit 3. An input terminal of the continuous-time linear equalizer (hereinafter referred to as CTLE circuit) 2 is electrically connected to the reception node 200a. The CTLE circuit 2 is electrically connected to the amplifier 21. The amplifier 21 is electrically connected to the DFE circuit 3. The DFE circuit 3 is electrically connected to the internal circuit 203 (see FIG. 1). The clock CLK reproduced by the CDR circuit 204 is input to the DFE circuit 3.

The CTLE circuit 2 is a circuit that performs first-stage equalization. A gain characteristic of the CTLE circuit 2 can be designed as an inverse characteristic of an attenuation characteristic of the wired communication path 300. In the gain characteristic of the CTLE circuit 2, attenuation occurs with respect to the inverse characteristic of the attenuation characteristic of the wired communication path 300 in a vicinity of the Nyquist frequency. The circuit involved in a compensation of the attenuation is the DFE circuit 3.

The amplifier 21 receives and amplifies a signal output from the CTLE circuit 2, and outputs the amplified signal. The amplified signal is input to the DFE circuit 3 as a data signal DS.

The DFE circuit 3 is a circuit that performs second-stage equalization. The DFE circuit 3 is a circuit that compensates for the attenuation caused in the CTLE circuit 2, for example, the influence of ISI, and corresponds to a circuit that reduces the BER (bit error rate reduction circuit). As illustrated in FIG. 2, the DFE circuit 3 has a sampler unit 31, a determination circuit 33, an arithmetic circuit 35, a decision circuit 37, and a plurality of delay circuits. In the embodiments described herein, description will be made assuming that the determination circuit 33, the arithmetic circuit 35, and the decision circuit 37 within the frame of an alternate long and short dash line 4 in FIG. 2 are mainly composed of circuits that handle digital values. At this time, the determination circuit 33 determines, as digital values, a plurality of indexes indicating the degree of confidence of a plurality of output values from a plurality of sampler circuits based on the bit values of the data signals DS at a plurality of different past timings. The determination circuit 33 outputs the plurality of indexes, as digital values, to the arithmetic circuit 35. The arithmetic circuit 35 computes, with digital values, the scores for a plurality of bit values that are candidates for the current data signals based on the plurality of determined indexes and the plurality of current output values from the plurality of sampler circuits. The decision circuit 37 selects one bit value from the plurality of candidate bit values using the digital values output from the arithmetic circuit 35 and the scores as digital values. In FIG. 2, two-stage delay circuits, i.e., a first delay circuit 39 and a second delay circuit 41, are indicated as an example of the plurality of delay circuits, but the number of stages of the delay circuits is not limited to two. The plurality of delay circuits delay the decision result decided by the decision circuit 37 and output the result to the determination circuit 33.

The sampler unit 31 has a plurality of sampler circuits having different thresholds. The plurality of sampler circuits are electrically connected in parallel between the arithmetic circuit 35 and the amplifier 21. A plurality of output values from the plurality of sampler circuits, that is, a plurality of sampling results are output to the arithmetic circuit 35. Hereinafter, for the sake of specific description, the sampler unit 31 will be described as having a first sampler circuit 311, a second sampler circuit 313, and a third sampler circuit 315 as the plurality of sampler circuits. The first sampler circuit 311, the second sampler circuit 313, and the third sampler circuit 315 are electrically connected to a first node n1. The first node n1 is electrically connected to the amplifier 21. Each of the first sampler circuit 311, the second sampler circuit 313, and the third sampler circuit 315 is electrically connected to the arithmetic circuit 35.

That is, the first sampler circuit 311, the second sampler circuit 313, and the third sampler circuit 315 are electrically connected in parallel between the arithmetic circuit 35 and the amplifier 21. The first sampler circuit 311, the second sampler circuit 313, and the third sampler circuit 315 perform sampling on the data signal DS in synchronization with the clock CLK output from the CDR circuit 204. The first to third sampling results output from the first to third sampler circuits 311, 313, and 315, respectively, correspond to logic values indicating 0 or 1.

The first sampler circuit 311 is composed of a flip-flop circuit, for example. The first sampler circuit 311 has a first threshold Th1. The first sampler circuit 311 outputs the first sampling result based on the data signal DS input via the first node n1 and the first threshold Th1 by the clock CLK. Specifically, the first sampler circuit 311 compares the voltage level of the data signal DS with the first threshold Th1. If the voltage level of the data signal DS exceeds the first threshold Th1, a logic value corresponding to 1 is output to the arithmetic circuit 35 as the first sampling result. If the voltage level of the data signal DS is less than the first threshold Th1, a logic value corresponding to 0 is output to the arithmetic circuit 35 as the first sampling result.

The second sampler circuit 313 is composed of a flip-flop circuit, for example. The second sampler circuit 313 has a second threshold Th2 which is greater than the first threshold Th1. The second sampler circuit 313 outputs the second sampling result based on the data signal DS and the second threshold by the clock CLK. Specifically, the second sampler circuit 313 compares the voltage level of the data signal DS with the second threshold Th2. If the voltage level of the data signal DS exceeds the second threshold Th2, a logic value corresponding to 1 is output to the arithmetic circuit 35 as the second sampling result. If the voltage level of the data signal DS is less than the second threshold Th2, a logic value corresponding to 0 is output to the arithmetic circuit 35 as the second sampling result.

The third sampler circuit 315 is composed of a flip-flop circuit, for example. The third sampler circuit 315 has a third threshold Th3 that is smaller than the first threshold Th1. The third sampler circuit 315 outputs the third sampling result based on the data signal DS and the third threshold Th3 by the clock CLK. Specifically, the third sampler circuit 315 compares the voltage level of the data signal DS with the third threshold Th3. If the voltage level of the data signal DS exceeds the third threshold Th3, a logic value corresponding to 1 is output to the arithmetic circuit 35 as the third sampling result. If the voltage level of the data signal DS is less than the third threshold Th3, a logic value corresponding to 0 is output to the arithmetic circuit 35 as the third sampling result.

The first threshold Th1, the second threshold Th2, and the third threshold Th3 as the plurality of thresholds correspond to, for example, voltages. For example, the first threshold Th1 corresponds to a voltage value that serves as a reference of the data signal DS (hereinafter referred to as reference voltage level). The reference voltage level is 0 V, for example. The difference between the second threshold Th2 and the first threshold Th1 may be set to be equal to the difference between the first threshold Th1 and the third threshold Th3. For example, as illustrated in FIG. 2, when the second threshold Th2 corresponds to a voltage value of (+Vamp) V, the third threshold Th3 corresponds to a voltage value of (−Vamp) V.

Note that the plurality of sampler circuits included in the sampler unit 31 are not limited to three sampler circuits, and may be, for example, an odd number of sampler circuits of 5 or more. At this time, one threshold in the plurality of sampler circuits corresponds to the reference voltage level. In addition, in the plurality of sampler circuits, the plurality of thresholds used in the sampler circuits other than the sampler circuit having the reference voltage level as the threshold corresponds to a plurality of voltage values that are symmetrical with respect to the reference voltage level.

Figures 3, 4:
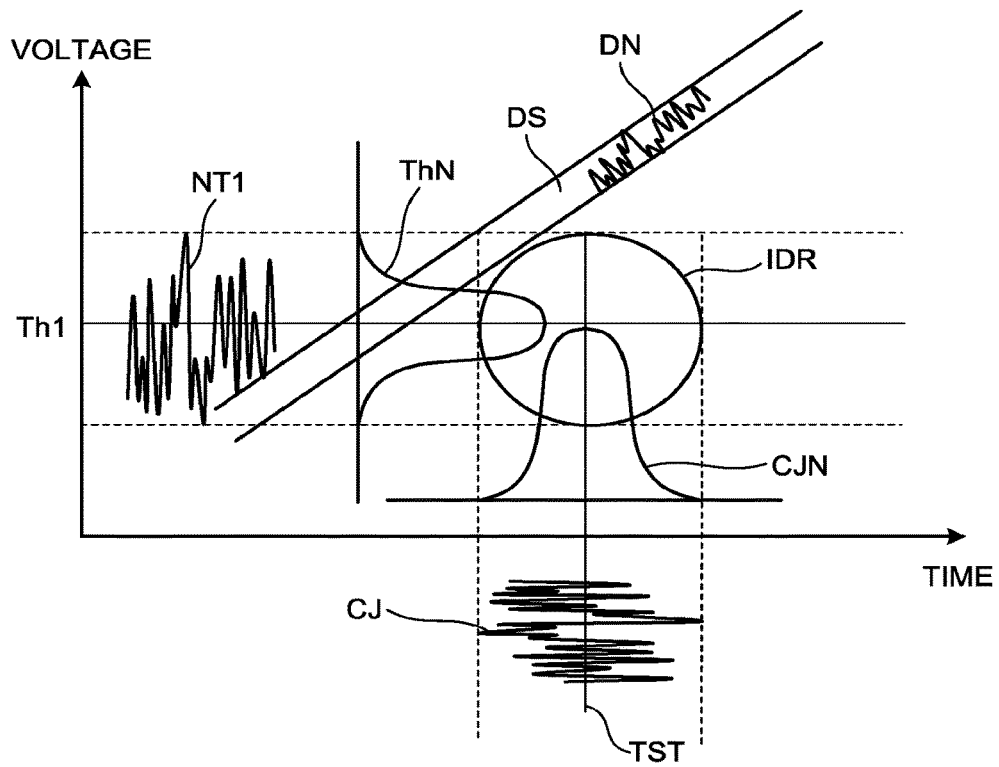
FIG. 3 is a diagram illustrating an example of an indefinite region related to sampling by a first sampler circuit in the embodiment.
FIG. 4 is a diagram illustrating an example of a correspondence relationship in the embodiment.

FIG. 3 is a diagram for conceptually explaining an indefinite region related to sampling by the first sampler circuit 311. As illustrated in FIG. 3, noise NT1 including normal device noise and crosstalk noise between wirings is superimposed on the first threshold Th1. The distribution ThN illustrated in FIG. 3 is a histogram in which the voltage values of the first threshold Th1 on which the noise NT1 is superimposed are collected for a plurality of unit intervals (UIs) and illustrated as appearance frequencies in one UI. For example, one UI is a period corresponding to one cycle of the clock CLK. That is, the distribution ThN corresponds to the frequency of the noise NT1, and indicates the uncertainty of the first threshold Th1.

Further, the clock CLK has jitter CJ as illustrated in FIG. 3. The distribution CJN is a histogram in which times corresponding to a target sampling timing TST based on the clock CLK are collected for the plurality of UIs and illustrated as appearance frequencies in one UI. That is, the distribution CJN corresponds to the frequency of the time corresponding to the jitter CJ of the clock CLK, and indicates the uncertainty of the simultaneity of the clock CLK due to the jitter CJ. In addition, the data signal DS has noise DN. The first sampler circuit 311 has an indefinite region IDR in which the data signal DS cannot be determined correctly, as illustrated in FIG. 3, due to the noise DN included in the data signal DS, uncertainty ThN of the first threshold Th1, and uncertainty CJN of simultaneity. Similarly, the second sampler circuit 313 and the third sampler circuit 315 each have an indefinite region.

For these reasons, it is necessary to sufficiently separate the plurality of thresholds in the plurality of sampler circuits so that the indefinite regions of the plurality of sampler circuits do not overlap with the amplitude of the data signal DS. In addition, the input signal needs to have a sufficient signal amplitude so that the second sampler circuit 313 and the third sampler circuit 315 operate properly. However, in order to increase the interval between the respective thresholds, it is necessary to increase the amplitude of the input signal of the DFE circuit 3 by increasing the boost amount by the CTLE circuit 2 or increasing the gain of the amplifier 21. That is, the CTLE circuit 2 and the amplifier 21 need to have a wide bandwidth and high gain performance. Increasing the amplitude of the input signal of the DFE circuit 3 may increase the amplitude of noise. Therefore, an object of the embodiments described herein is to improve the decision accuracy of the bit value for the data signal DS, i.e., to reduce the bit error rate of the data signal DS, without requiring the CTLE circuit 2 and the amplifier 21 to have a wide bandwidth or gain performance.

As illustrated in FIG. 2, the determination circuit 33 has an input node to which outputs from the first delay circuit 39 and the second delay circuit 41 are input. Specifically, the input node of the determination circuit 33 is electrically connected to the output nodes of the first delay circuit 39 and the second delay circuit 41, respectively. The output node of the determination circuit 33 is electrically connected to an input node of the arithmetic circuit 35. The determination circuit 33 determines a plurality of indexes (hereinafter referred to as confidence indexes) indicating the degree of confidence of a plurality of output values (a plurality of sampling results) from the plurality of sampler circuits, based on the bit values of the data signals DS at a plurality of different past timings. The respective bit values of the data signals DS at a plurality of different past timings correspond to decision results in which the bit values of the data signals DS were decided by the decision circuit 37 at the plurality of different past timings. The decision results indicate, for example, whether the voltages of the data signals DS at the plurality of different past timings exceed or are lower than the reference voltage level. For example, when the voltage of the data signal DS exceeds the reference voltage level, the decision result is 1. Further, when the voltage of the data signal DS is lower than the reference voltage level, the decision result is 0. The decision results are delayed by a plurality of delay circuits located downstream from the decision circuit 37 and input to the input node of the determination circuit 33.

Specifically, the determination circuit 33 determines a first confidence index applied to the first sampling result, a second confidence index applied to the second sampling result, and a third confidence index applied to the third sampling result, based on the bit value decided by the decision circuit 37 one UI before the present time (hereinafter referred to as first decision result) and the bit value decided by the decision circuit 37 two UIs before the present time (hereinafter referred to as second decision result). For example, the determination circuit 33 stores a correspondence table (lookup table) of the first to third confidence indexes for the combination of the first decision result and the second decision result. The determination circuit 33 determines the first to third confidence indexes by collating a plurality of bit values related to the first decision result and the second decision result with the correspondence table. In general, when the number of stages of the delay circuit is j (j is a natural number of 2 or more), the correspondence table shows the first to third confidence indexes corresponding to the $j^{th}$ power of 2 decision results on a one-to-one basis. At this time, the determination circuit 33 determines the first to third confidence indexes by collating the j decision results along the time series with the correspondence table. The determination circuit 33 outputs the determined first to third confidence indexes to the arithmetic circuit 35.

FIG. 4 is a diagram illustrating an example of a correspondence relationship LUT used in the determination circuit 33. As illustrated in FIG. 4, the first to third confidence indexes are associated with bit values indicating the first decision result (J1) and bit values indicating the second decision result (J2). For example, when the combination of the second decision result and the first decision result is (J2=1, J1=0), the determination circuit 33 selects (CI1, CI2, CI3)=(4, 2, 5) as the first to third confidence indexes.

When the bit values indicating the decision results are opposite to (J2, J1)=(1, 0), that is, when (J2, J1)=(0, 1), the determination circuit 33 determines the first to third confidence indexes (CI1, CI2, CI3)=(4, 5, 2) in which the value of the second confidence index CI2 and the value of the third confidence index CI3 with respect to the first to third confidence indexes (CI1, CI2, CI3)=(4, 2, 5) corresponding to (J2, J1)=(1, 0), are interchanged. As illustrated in FIG. 4, when the bit value indicating the second decision result J2 and the bit value indicating the first decision result J1 are reversed, the value of the second confidence index CI2 and the value of the third confidence index CI3 are interchanged. The first to third confidence indexes illustrated in FIG. 4 represent the degree of likelihood (accuracy) and the probability of likelihood for the first to third sampling results at the present time, based on the second decision result J2 and the first decision result J1. In other words, the first to third confidence indexes correspond to the likelihood of the voltage transition of the data signal DS with respect to the reference voltage level in the current data signal DS, i.e., the reciprocals of the correct answer rates of the first to third sampling results and the error rates in deciding the bit values for the current data signal DS.

As illustrated in FIG. 2, the arithmetic circuit 35 has a first input node electrically connected to an output node of the sampler unit 31 and a second input node electrically connected to an output node of the determination circuit 33. That is, the arithmetic circuit 35 is electrically connected to each of the first to third sampler circuits, and is electrically connected to the determination circuit 33. An output node of the arithmetic circuit 35 is electrically connected to the decision circuit 37. The arithmetic circuit 35 computes a plurality of bit values that are candidates for the current data signal DS (hereinafter referred to as candidate bit values), based on the plurality of confidence indexes determined by the determination circuit 33 and the plurality of sampling results by the plurality of sampler circuits. The candidate bit values are determination candidates for the current data signal DS, and are digital values indicating 0 or 1.

Specifically, the arithmetic circuit 35 computes scores for each candidate bit value by adding the first to third confidence indexes according to the first to third sampling results. In other words, the arithmetic circuit 35 computes, for each candidate bit value, the total value of the values of the first to third confidence indexes corresponding to the first to third sampling results as scores. The scores are digital values corresponding to the candidate bit values on a one-to-one basis. The arithmetic circuit 35 outputs the scores as digital values to the decision circuit 37.

The decision circuit 37 is electrically connected to the output node of the arithmetic circuit 35. An output node of the decision circuit 37 is electrically connected to a second node n2. The second node n2 is electrically connected to the first delay circuit 39 and the internal circuit 203. The decision circuit 37 receives the clock CLK output from the CDR circuit 204. The decision circuit 37 decides the bit value for the current data signal DS in synchronization with the clock CLK. Specifically, the decision circuit 37 selects one bit value from the candidate bit values using the scores computed by the arithmetic circuit 35. Specifically, the decision circuit 37 selects, as the bit value of the decision result, the candidate bit value corresponding to the larger score of the two scores corresponding to the two candidate bit values on a one-to-one basis. The decision circuit 37 outputs the bit value selected as the decision result to the first delay circuit 39 and the internal circuit 203.

The first delay circuit 39 is arranged on a feedback path from the output node of the decision circuit 37 back to the arithmetic circuit 35. The first delay circuit 39 is electrically connected to the second node n2 and a third node n3. The first delay circuit 39 has a delay amount Z. The first delay circuit 39 gives the delay amount $Z^{-1}$ to the decision result output from the decision circuit 37. The decision result to which the delay amount $Z^{-1}$ has been given, that is, the first decision result is output to the second delay circuit 41 and the determination circuit 33 via the third node n3.

The second delay circuit 41 is arranged on a feedback path from the output node of the decision circuit 37 back to the arithmetic circuit 35. The second delay circuit 41 is electrically connected to the third node n3 and the determination circuit 33. The second delay circuit 41 has a delay amount $Z^{-1}$. The second delay circuit 41 gives the delay amount $Z^{-1}$ to the first decision result that is the decision result to which the delay amount $Z^{-1}$ has been given by the first delay circuit 39. The decision result in which the delay amount $Z^{-1}$ has been given to the first decision result, that is, the second decision result, is output to the determination circuit 33.

Figure 5:
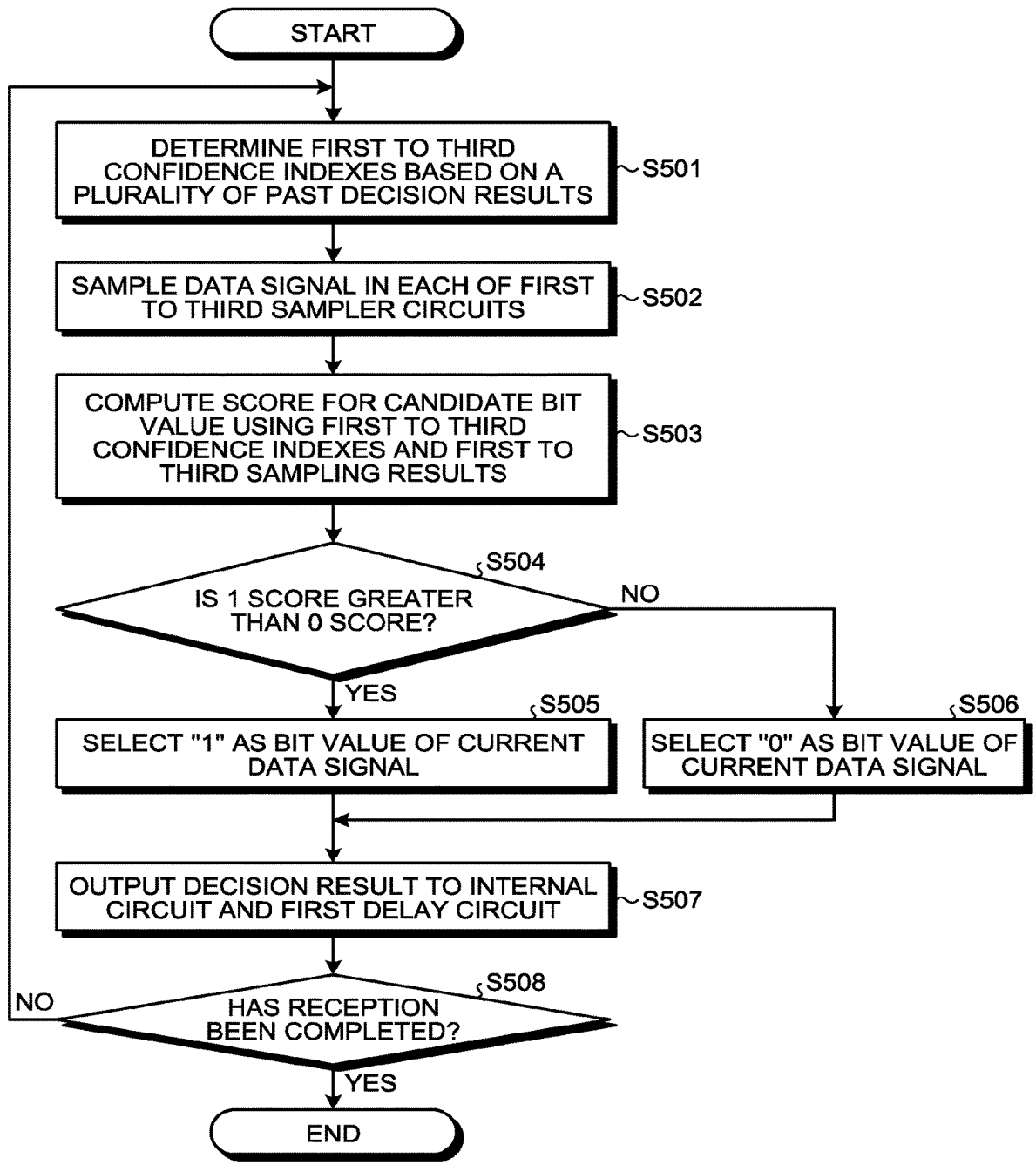
FIG. 5 is a diagram illustrating an example of a processing procedure related to a decision operation in the embodiment.

The configuration of the equalization circuit 1 provided in the semiconductor integrated circuit 205 has been described above. Hereinafter, an operation of deciding the bit value for the current data signal DS (hereinafter referred to as decision operation) will be described. FIG. 5 is a diagram illustrating an example of a processing procedure in the decision operation.

(Decision Operation)

(S501)

The determination circuit 33 determines the first to third confidence indexes based on a plurality of past decision results. For example, the determination circuit 33 determines the first to third confidence indexes using the first decision result J1, the second decision result J2, and the correspondence table LUT illustrated in FIG. 4. Specifically, when the first decision result J1=0 and the second decision result J=1, the determination circuit 33 determines (CI1, CI2, CI3)=(4, 2, 5) as the first to third confidence indexes used in the arithmetic circuit 35. When there is no past decision result, e.g., immediately after the start of reception of the data signal DS, the determination circuit 33 uses the decision result prepared as a default value and the correspondence table LUT, for example, to determine the first to third confidence indexes. The determined first to third confidence indexes are output to the arithmetic circuit 35.

Figure 6:
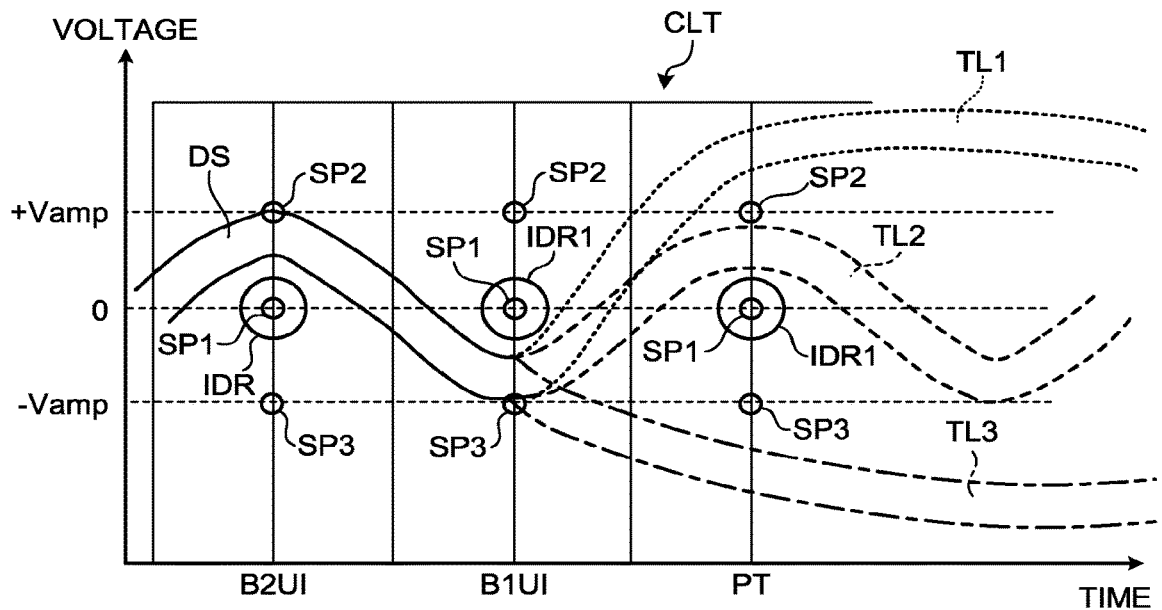
FIG. 6 is a diagram illustrating an example of data signal transition in a case where a second decision result is 1 and a first decision result is 0 in the embodiment.

FIG. 6 is a diagram illustrating an example of the transition of the data signal DS (hereinafter referred to as alternate transition CLT (Clock-Like to)) in a case where the second decision result J2 before two UIs(B2UI) is (J2=1) and the first decision result J1 before one UI (B1UI) is 0 (J1=0). That is, FIG. 6 illustrates an example of the data signal DS in which the decision result transitions from 1 before two UIs (B2UI) to 0 before one UI (B1UI). An indefinite region IDR is illustrated around a first sampling point SP1 related to the first sampler circuit 311. The first threshold Th1 related to the first sampling point SP1 is 0 V. The second threshold Th2 related to a second sampling point SP2 is (+Vamp) V. The third threshold Th3 related to a third sampling point SP3 is (−Vamp) V.

As illustrated in FIG. 6, in the alternate transition CLT, the amplitude of the data signal DS can be reduced due to the loss of signal strength and the influence of ISI. However, in the embodiments described herein, an amplitude equal to or greater than the indefinite region IDR is guaranteed in the data signal DS.

As illustrated in FIG. 6, when the second decision result J2=1 and the first decision result J1=0, three trajectories are predicted (assumed) as the transition of the data signal DS from before one UI (B1UI) to the present time PT: a first trajectory TL1 sandwiched between two dotted line, a second trajectory TL2 sandwiched between two broken lines, and a third trajectory TL3 sandwiched between two alternate long and short dashed lines. The amplitude differences in the first trajectory TL1, the second trajectory TL2, and the third trajectory TL3, respectively, are caused by the loss of signal intensity in the data signal DS and the influence of ISI. As illustrated in FIG. 6, when the second decision result J2=1 and the first decision result J1=0, the determination circuit 33 determines the first to third confidence indexes in the first row of the correspondence table LUT illustrated in FIG. 4. Next, the determination circuit 33 outputs the first confidence index CI1 indicating 4 and the second confidence index CI2 indicating 2 and the third confidence index CI3 indicating 5, respectively, to the arithmetic circuit 35.

Figure 7:
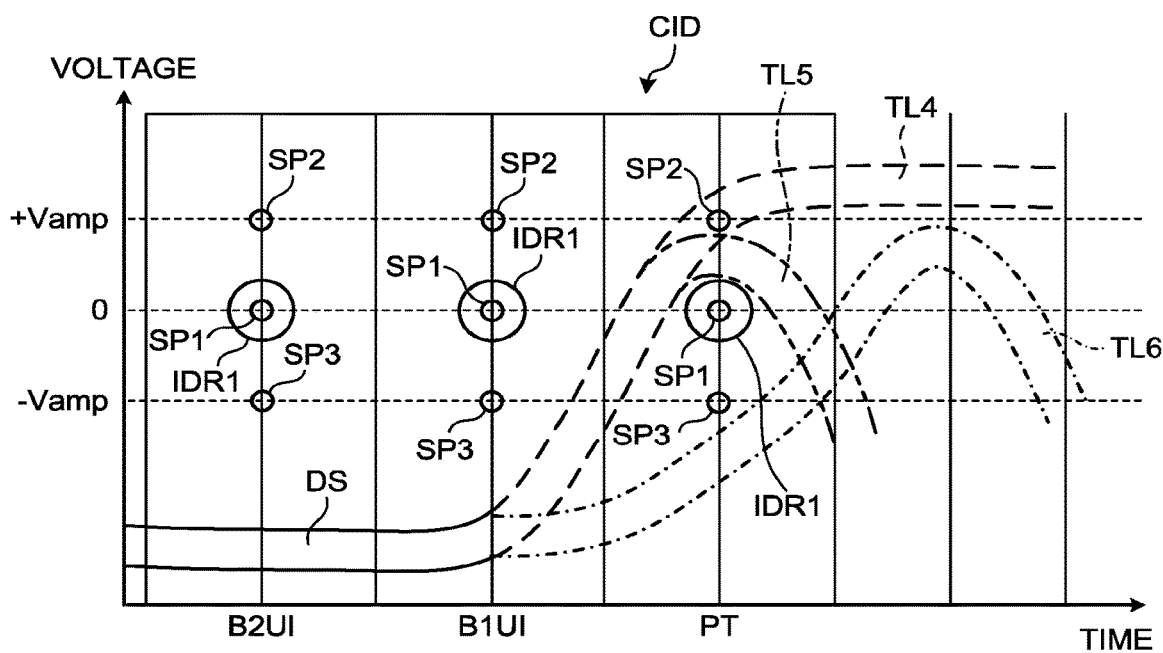
FIG. 7 is a diagram illustrating an example of data signal transition in a case where the second decision result is 0 and the first decision result is 0 in the embodiment.

FIG. 7 is a diagram illustrating an example of the transition of the data signal DS in a case where the second decision result J2 before two UIs (B2UI) is 0 (J2=0) and the first decision result J1 before 1UI (B1UI) is 0 (J1=0) (hereinafter referred to as the same transition CID (Continuous Identical data)). That is, FIG. 7 illustrates an example of the data signal DS in which the decision result transitions from 0 before two UIs (B2UI) to 0 before one UI (B1UI). The amplitude of the data signal DS continuously presents the same decision result in the same transition CID, and thus is less susceptible to the signal strength loss and the influence of ISI, and is larger than the alternate transition CLT. As illustrated in FIG. 7, when the second decision result J2=0 and the first decision result J1=0, three trajectories are predicted (assumed) as trajectories of the transition of the data signal DS from before one UI (B1UI) to the present time PT: a fourth trajectory TL4 sandwiched between two long dashed line, a fifth trajectory TL5 sandwiched between two alternate long and two short dashes lines, and a sixth trajectory TL6 sandwiched between two double lines.

The amplitude differences in a fourth trajectory TL4, a fifth trajectory TL5, and a sixth trajectory TL6, respectively, illustrated in FIG. 7 are caused by the loss of signal intensity in the data signal DS and the influence of ISI, as described above. As illustrated in FIG. 7, when the second decision result J2=0 and the first decision result J1=0, the determination circuit 33 determines the first to third confidence indexes in the second row of the correspondence table LUT illustrated in FIG. 4. Next, the determination circuit 33 outputs the first confidence index CI1 indicating 4 and the second confidence index CI2 indicating 3 and the third confidence index CI3 indicating 6, respectively, to the arithmetic circuit 35.

(S502)

As illustrated in FIG. 5, the first to third sampler circuits 311, 313, and 315 execute sampling on the input data signal DS using the corresponding first to third thresholds Th1, Th2, and Th3 according to the clock CLK. The first to third sampling results by the first to third sampler circuits 311, 313, and 315 are logic values indicating 0 or 1. The first to third sampling results are output to the arithmetic circuit 35.

(S503)

The arithmetic circuit 35 applies the first confidence index CI1 to the first sampling result, applies the second confidence index CI2 to the second sampling result, and applies the third confidence index CI3 to the third sampling result, thereby computing a score for the candidate bit value on the data signal DS at the present time PT.

For example, there is exemplified a case where the determined first to third confidence indexes are 4, 2, and 5, respectively, as shown in the second row of the correspondence table LUT illustrated in FIG. 4 and the first to third sampling results are 1, 0, and 1, respectively, as in the alternate transition CLT illustrated in FIG. 6. In this case, the score corresponding to the candidate bit value of 0 (hereinafter referred to as 0 score) is the total value "2" of the values of the first to third confidence indexes corresponding to the locations where the sampling result is 0. The score corresponding to the candidate bit value of 1 (hereinafter referred to as 1 score) is the total value "9" of the values of the first to third confidence indexes corresponding to the location where the sampling result is 1. The arithmetic circuit 35 outputs the computed 0 score and 1 score to the decision circuit 37.

(S504)

The decision circuit 37 compares the 0 score with the 1 score in synchronization with the clock CLK. If the 1 score is greater than the 0 score (YES in S504), the processing of S505 is executed. If the 1 score is not greater than 0 score (NO in S504), the processing of S506 is executed.

(S505)

If the 1 score is greater than the 0 score (YES in S504), the decision circuit 37 selects "1" as the bit value of the data signal DS at the present time PT on which sampling has been performed.

(S506)

If the 1 score is not greater than the 0 score (NO in S504), the decision circuit 37 selects "0" as the bit value of the data signal DS at the present time PT on which sampling has been performed.

(S507)

The decision circuit 37 outputs the selected bit value as the decision result to the internal circuit 203 and the first delay circuit 39. The first delay circuit 39 gives the delay amount $Z^{-1}$ to the decision result. The first decision result J1 to which the delay amount $Z^{-1}$ has been given is output to the determination circuit 33 and the second delay circuit 41. The second delay circuit 41 gives the delay amount $Z^{-1}$ to the first decision result J1. The first decision result J1 to which the delay amount $Z^{-1}$ has been given is output to the determination circuit 33 as the second decision result J2.

(S508)

If the reception of the data signal DS has been completed (YES in S508), the decision operation ends. If the reception of the data signal DS has not been completed (NO in S508), the processing of S501 to S508 is repeated. By the processing of S504 to S506, the decision circuit 37 decides the bit value for the data signal DS at the present time PT using the computed score.

FIG. 8 is a diagram illustrating examples of first to third sampling results, 0 score, 1 score, and a decision result at the present time PT in the alternate transition CLT illustrated in FIG. 6. As illustrated in FIGS. 6 and 8, when the transition of the data signal DS from before one UI (B1UI) to the present time PT is the first trajectory TL1, the candidates for the first to third sampling results may be two candidates, EL1 and EL2. For example, at the present time PT in the first trajectory TL1, the first sampling result and the third sampling result can be reliably decided to be 1, but the second sampling result may be either 0 or 1 due to the influence of noise in the data signal DS. Therefore, the two candidates (EL1 and EL2) are assumed in the first trajectory TL1 in FIG. 8. The 0 score in the candidate EL1 is a total of 2 for the confidence index corresponding to the second sampling result for which the sampling result is 0. Further, the 1 score in the candidate EL1 is a total of 4+5=9 for the confidence indexes corresponding to the first sampling result and the third sampling result for which the sampling result is 1. The 0 score in the candidate EL2 is 0 because there is no sampling result of 0. Further, the 1 score in the candidate EL2 is a total of 2+4+5=11 for the confidence indexes corresponding to the first to third sampling results in which the sampling result is 1. In both EL1 and EL2, the 1 score is greater than the 0 score, so the decision result at the present time PT is 1.

As illustrated in FIG. 8, when the transition of the data signal DS from before one UI (B1UI) to the present time PT is the second trajectory TL2, the candidates for the first to third sampling results may be two candidates, EL3 and EL4. For EL3 and EL4, the 0 score and the 1 score are calculated in the same manner as described above. In EL3, the 1 score is greater than the 0 score. On the other hand, in EL4, the 0 score is greater than the 1 score, but the amplitude equal to or greater than the indefinite region IDR around the first sampling point SP1 is guaranteed in the data signal DS. Thus, the frequency of a state FG1 in which the 0 score is 6 and the 1 score is 5 is very low. For this reason, in the case of the second trajectory TL2, there is a high possibility that the decision result at the present time PT may be 1.

When the transition of the data signal DS from before one UI (B1UI) to the present time PT is the third trajectory TL3, the candidates for the first to third sampling results may be two candidates, EL5 and EL6. For EL5 and EL6, the 0 score and the 1 score are calculated in the same manner as described above. In both EL5 and EL6, the 0 score is greater than the 1 score, so the decision result at the present time PT is 0.

FIG. 9 is a diagram illustrating examples of the first to third sampling results, 0 score, 1 score, and a current decision result in the same transition CID illustrated in FIG. 7. As illustrated in FIGS. 7 and 9, when the transition of the data signal DS from before one UI (B1UI) to the present time PT is the fourth trajectory TL4, the candidates for the first to third sampling results may be two candidates, EI1 and EI2. For example, at the present time PT in the fourth trajectory TL4, the first sampling result and the third sampling result can be reliably decided to be 1, but the second sampling result may be either 0 or 1 due to the influence of noise in the data signal DS. Therefore, the two candidates (EI1 and EI2) are assumed in the fourth trajectory TL4 in FIG. 9. The 0 score in the candidate EI1 is a total of 3 for the confidence index corresponding to the second sampling result for which the sampling result is 0. Further, the 1 score in the candidate EI1 is a total of 4+6=10 for the confidence indexes corresponding to the first sampling result and the third sampling result for which the sampling result is 1. The 0 score in the candidate EI2 is 0 because there is no sampling result of 0. Further, the 1 score in the candidate EI2 is a total of 3+4+6=13 for the confidence indexes corresponding to the first to third sampling results in which the sampling result is 1. In both EI1 and EI2, the 1 score is greater than the 0 score, so the decision result at the present time PT is 1.

As illustrated in FIG. 9, when the transition of the data signal DS from before one UI (B1UI) to the present time PT is the fifth trajectory TL5, the candidates for the first to third sampling results may be two candidates, EI3 and EI4. For EI3 and EI4, the 0 score and the 1 score are calculated in the same manner as described above. In EI3, the 1 score is greater than the 0 score. On the other hand, in EI4, the 0 score is greater than the 1 score, but the amplitude equal to or greater than the indefinite region IDR around the first sampling point SP1 is guaranteed in the data signal DS. Thus, the frequency of a state FG2 in which the 0 score is 7 and the 1 score is 6 is very low. For this reason, in the case of the fifth trajectory TL5, there is a high possibility that the decision result at the present time PT may be 1.

When the transition of the data signal DS from before one UI (B1UI) to the present time PT is the sixth trajectory TL6, the candidates for the first to third sampling results may be two candidates, EI5 and EI6. For EI5 and EI6, the 0 score and the 1 score are calculated in the same manner as described above. In both EI5 and EI6, the 0 score is greater than the 1 score, so the decision result at the present time PT is 0.

According to the embodiments, the data signals DS are sampled using the first to third thresholds, and the first to third confidence indexes are determined based on the bit values of the data signals DS at a plurality of different past timings such as the first decision result J1 and the second decision result J2. Next, the scores for the candidate bit values are computed based on the determined first to third confidence indexes and the first to third sampling results, and the bit value corresponding to the larger score of the computed scores is selected as the bit value of the data signal DS at the present time PT.

For this reason, according to the embodiments, the correct answer rate of the bit value of the data signal DS at the present time PT can be improved. As a result, as compared with the case where the bit value of the data signal DS is decided only using one first sampling point SP1, the correct answer rate for decision of the bit value can be improved. In addition, the performance required of the preceding equalizer such as the CTLE circuit 2 can be relaxed. As a result, there can be provided the semiconductor integrated circuit 205 that can reduce the bit error rate even if there is a limitation on the performance of widening the bandwidth of the CTLE circuit 2 under the constraints of the process, area, and power of the semiconductor constituting the CTLE circuit 2.

(First Modification)

Figure 10:
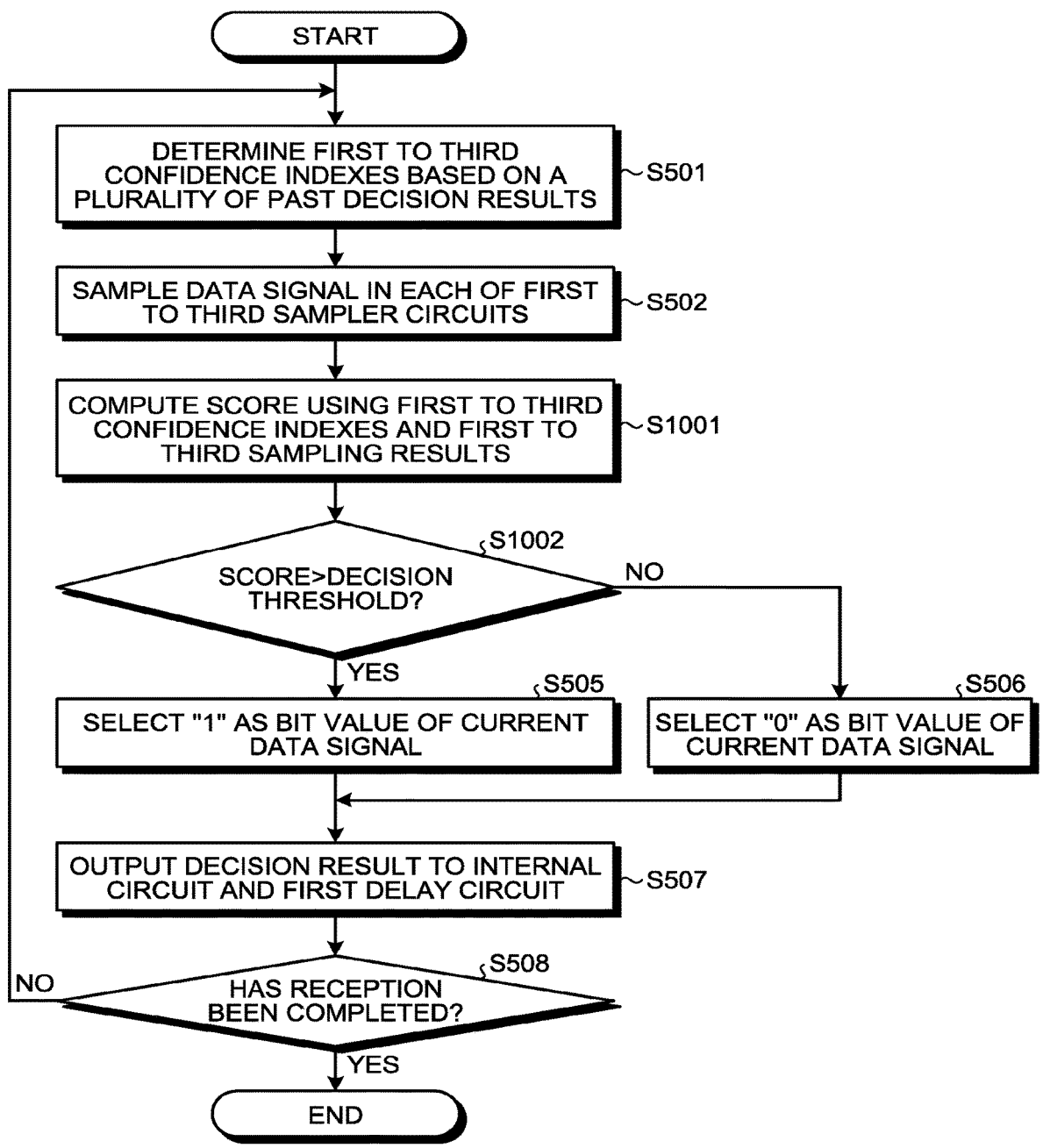
FIG. 10 is a diagram illustrating an example of a processing procedure of a decision operation in a first modification.

The difference between a first modification and the embodiments resides in score calculation and decision processing by the decision circuit 37 in the decision operation. FIG. 10 is a diagram illustrating an example of a processing procedure of the decision operation in the first modification. In FIG. 10, the same reference numeral is attached to the same processing as in FIG. 5, and the description thereof is omitted.

(Decision Operation)

(S1001) The arithmetic circuit 35 computes scores based on the first to third sampling results and the determined first to third confidence indexes. Specifically, the arithmetic circuit 35 gives −1 to the sampling result corresponding to the logic value of 0. The arithmetic circuit 35 computes the scores by computing a sum of products of the first to third sampling results having a value of 1 or −1 and the first to third confidence indexes. Hereinafter, for the sake of specific explanation, it is assumed that the first to third confidence indexes determined in S501 are (4, 2, 5) in the first row of the correspondence table illustrated in FIG. 4. It is assumed that the first to third sampling results at the present time PT are 1, 0, and 1. At this time, the arithmetic circuit 35 computes a sum of products of (1, −1, 1) and (4, 2, 5) (1×4+(−1)×2+1×5=7) as a score. The computed score is, for example, a value obtained by computing difference between the 0 score and the 1 score illustrated in FIG. 8. The arithmetic circuit 35 outputs the computed score to the decision circuit 37.

(S1002)

The decision circuit 37 reads out a threshold (hereinafter referred to as decision threshold) stored in a memory (not illustrated) or the like. The decision threshold is, for example, +1, 0, or −1, and is set in advance. Hereinafter, for the sake of specific description, it is assumed that the decision threshold is −1. The decision circuit 37 compares the score computed in S1001 with the decision threshold. When the score is greater than the decision threshold (YES in S1002), the processing of S505 is executed. When the determination target value is not greater than the decision threshold (NO in S1002), the processing of S506 is executed. In this modification, the decision result at the present time PT in FIG. 8 is realized. Since the effects in this modification are the same as those of the embodiments, the description thereof is omitted.

(Second Modification)

Figure 11:
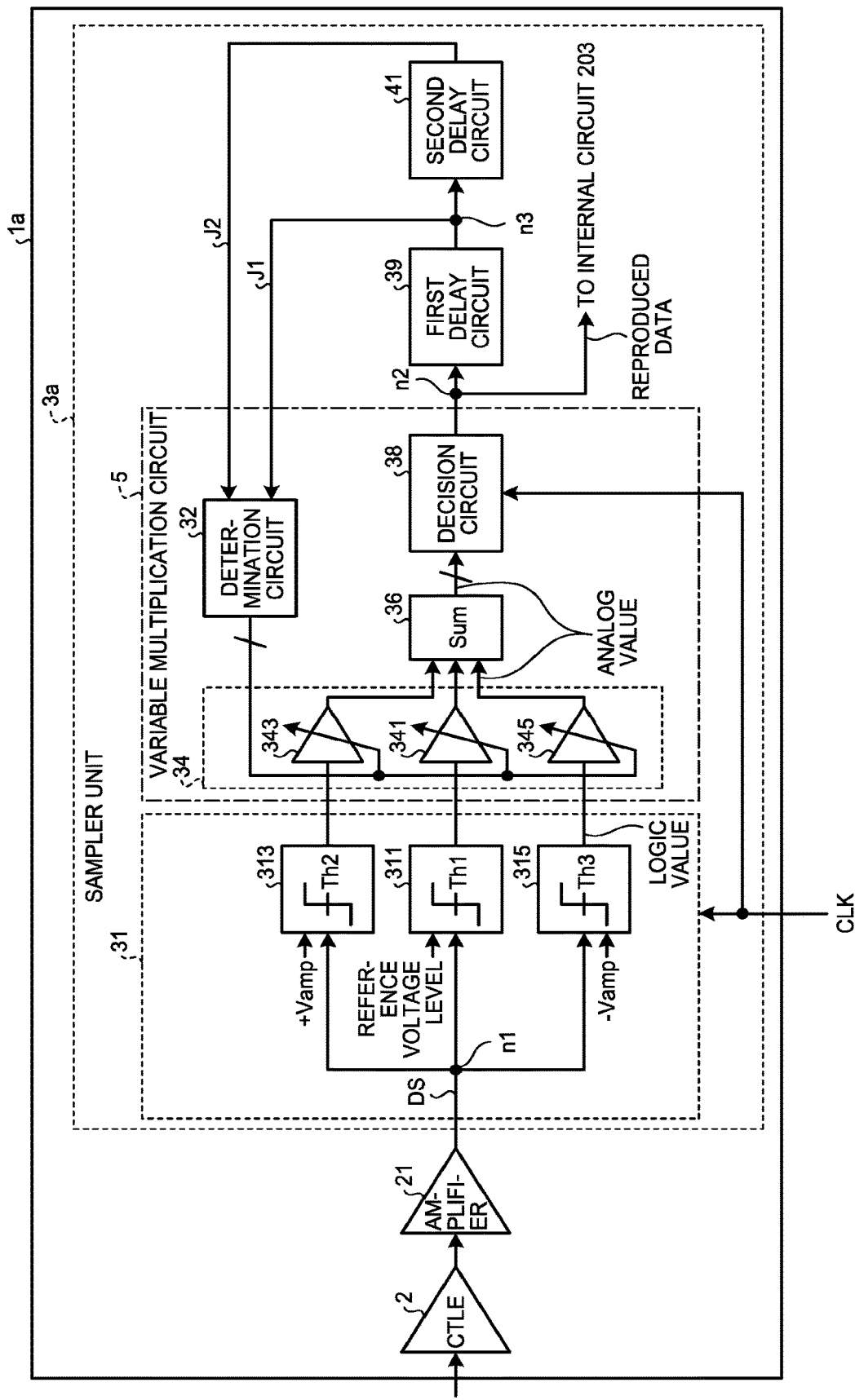
FIG. 11 is a diagram illustrating an example of a configuration of an equalization circuit according to a second modification.

The difference between the second modification and the embodiments resides in that the second modification includes a DFE circuit 3a in which part of the configuration of the DFE circuit 3 of the embodiments is realized by an analog circuit. FIG. 11 is a diagram illustrating an example of a configuration of an equalization circuit 1a according to a second modification. Hereinafter, the configuration different from that in FIG. 2 will be described with reference to FIG. 11. The DFE circuit 3a has a sampler unit 31, a determination circuit 32, a variable multiplication circuit 34, a summer circuit 36, a decision circuit 38, and a plurality of delay circuits (first delay circuit 39 and second delay circuit 41). In the second modification, the logic value output from each of the first to third sampler circuits is assumed to be −1 or +1. The logic value indicating −1 corresponds to 0 in the first to third sampling results in the embodiments. The determination circuit 32 corresponds to the determination circuit 33. The variable multiplication circuit 34 and the summer circuit 36 correspond to the arithmetic circuit 35. The determination circuit 33 which mainly handles analog signals outputs an analog signal that controls the gain to the arithmetic circuit 35 in accordance with a plurality of indexes. The arithmetic circuit 35 that mainly handles analog signals multiplies each of the current output values from the plurality of sampler circuits by the gain, and adds the current output values multiplied by the gain, thereby computing the score with the analog signals. The decision circuit 38 that mainly handles analog signals selects one bit value from a plurality of candidate bit values using the score of the analog signals.

The determination circuit 32 is electrically connected to the first delay circuit 39 and the second delay circuit 41. The determination circuit 32 is electrically connected to the variable multiplication circuit 34. Based on the bit values of the data signal DS at a plurality of different past timings, the determination circuit 32 determines, in an analog manner, a plurality of confidence indexes indicating the degree of confidence of the plurality of sampling results from the first to third sampler circuits. The determination circuit 32 is realized by a multiplexer using an analog switch, for example. The determination circuit 32 outputs signals corresponding to the determined first to third confidence indexes to the variable multiplication circuit 34. Since other operation contents in the determination circuit 32 are the same as those in the determination circuit 33, the description thereof is omitted.

The variable multiplication circuit 34 is electrically connected to the sampler unit 31, the determination circuit 32, and the summer circuit 36. The variable multiplication circuit 34 includes a first variable multiplication circuit 341, a second variable multiplication circuit 343, and a third variable multiplication circuit 345. The first variable multiplication circuit 341 is electrically connected to an output node of the first sampler circuit 311. The first variable multiplication circuit 341 electrically multiplies a first sampling result corresponding to the logic value output from the first sampler circuit 311 by the analog signal corresponding to the first confidence index CI1 output from the determination circuit 32 as a gain. The first variable multiplication circuit 341 changes the analog signal by which the first sampling result is multiplied according to the value of the first confidence index CI1 determined by the determination circuit 32. The first variable multiplication circuit 341 outputs the first sampling result multiplied by the first confidence index CI1 to the summer circuit 36.

The second variable multiplication circuit 343 is electrically connected to an output node of the second sampler circuit 313. The second variable multiplication circuit 343 electrically multiplies a second sampling result corresponding to the logic value output from the second sampler circuit 313 by the analog signal corresponding to the second confidence index CI2 output from the determination circuit 32 as a gain. The second variable multiplication circuit 343 changes the analog signal by which the second sampling result is multiplied according to the value of the second confidence index CI2 determined by the determination circuit 32. The second variable multiplication circuit 343 outputs the second sampling result multiplied by the second confidence index CI2 to the summer circuit 36.

The third variable multiplication circuit 345 is electrically connected to an output node of the third sampler circuit 315. The third variable multiplication circuit 345 electrically multiplies a third sampling result corresponding to the logic value output from the third sampler circuit 315 by the analog signal corresponding to the third confidence index CI3 output from the determination circuit 32 as a gain. The third variable multiplication circuit 345 changes the analog signal by which the third sampling result is multiplied according to the value of the third confidence index CI3 determined by the determination circuit 32. The third variable multiplication circuit 345 outputs the third sampling result multiplied by the third confidence index CI3 to the summer circuit 36. The analog signal corresponding to the gain is a voltage value or a current value.

The summer circuit 36 is electrically connected to an output node of the first variable multiplication circuit 341, an output node of the second variable multiplication circuit 343, and an output node of the third variable multiplication circuit 345, respectively. The summer circuit 36 is electrically connected to an input node of the decision circuit 38. The summer circuit 36 is realized as an adder. The summer circuit 36 adds the first sampling result multiplied by the first confidence index CI1, the second sampling result multiplied by the second confidence index CI2, and the third sampling result multiplied by the third confidence index CI3. The summer circuit 36 computes a score by the addition. The score in this modification corresponds to, for example, a value obtained by computing difference between the 1 score and the 0 score illustrated in FIG. 8. The summer circuit 36 outputs the computed score to the decision circuit 38.

The decision circuit 38 is electrically connected to an output node of the summer circuit 36. The decision circuit 38 is electrically connected to the second node n2. The decision circuit 38 is realized by, for example, a comparator. At this time, the reference voltage in the comparator is a voltage corresponding to the decision threshold. Since the operation in the decision circuit 38 is the same as that in the decision circuit 37 in the first modification, the description thereof is omitted.

Since the decision operation in the second modification is the same as that in the first modification, the description thereof is omitted. Since the effects in the second modification are the same as those of the embodiments, the description thereof is omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor integrated circuit comprising:
an equalizer circuit;
a decision circuit configured to decide a bit value of a data signal;
a sampler unit including a plurality of sampler circuits, the sampler circuits having a plurality of different thresholds and electrically connected in parallel between the equalizer circuit and the decision circuit;
a determination circuit configured to determine a plurality of indexes indicating a degree of confidence of a plurality of output values from the plurality of sampler circuits based on the bit values of the data signals at a plurality of different past timings; and
an arithmetic circuit configured to compute a plurality of scores for a plurality of bit values that are candidates for a current data signal based on the plurality of determined indexes and a plurality of current output values from the plurality of sampler circuits,
wherein the decision circuit is configured to select one bit value from the plurality of candidate bit values using the scores.

2. The semiconductor integrated circuit according to claim 1, wherein
the sampler unit includes, as the plurality of sampler circuits, a first sampler circuit having a first threshold, a second sampler circuit having a second threshold greater than the first threshold, and a third sampler circuit having a third threshold smaller than the first threshold, and
a difference between the second threshold and the first threshold is equal to a difference between the first threshold and the third threshold.

3. The semiconductor integrated circuit according to claim 2, wherein
the first sampler circuit is configured to execute first sampling on the data signal using the first threshold according to a clock,
the second sampler circuit is configured to execute second sampling on the data signal using the second threshold according to the clock,
the third sampler circuit is configured to execute third sampling on the data signal using the third threshold according to the clock, and
the sampler unit is configured to output logic values of 0 or 1 corresponding to results of the first to third sampling to the arithmetic circuit as the plurality of output values.

4. The semiconductor integrated circuit according to claim 3, wherein
the plurality of candidate bit values are 0 or 1, and
the arithmetic circuit is configured to:
compute 0 score for the candidate bit value of 0 among the scores by adding indexes corresponding to the results of the first to third sampling that have output the logic value of 0 among the plurality of determined indexes, and
compute 1 score for the candidate bit value of 1 among the scores by adding indexes corresponding to the results of the first to third sampling that have output the logic value of 1 among the plurality of determined indexes.

5. The semiconductor integrated circuit according to claim 4, wherein
the decision circuit is further configured to:
compare the 0 score with the 1 score in synchronization with the clock,
select 1 as the bit value of the current data signal when the 1 score is greater than the 0 score, and
select 0 as the bit value of the current data signal when the 1 score is smaller than the 0 score.

6. The semiconductor integrated circuit according to claim 4, wherein
the arithmetic circuit is further configured to compute difference between the 0 score and the 1 score, and
the decision circuit is further configured to:
select 1 as the bit value of the current data signal when the difference between the 1 score and the 0 score is greater than a decision threshold used in the decision of the difference between the 1 score and the 0 score, and
select 0 as the bit value of the current data signal when the difference between the 1 score and the 0 score is smaller than the decision threshold.

7. The semiconductor integrated circuit according to claim 1, wherein
the arithmetic circuit is configured to compute the scores by adding the determined indexes according to the current output values for each of the plurality of candidate bit values.

8. The semiconductor integrated circuit according to claim 7, wherein
the determination circuit is configured to output the plurality of indexes as digital values to the arithmetic circuit, and
the arithmetic circuit is further configured to compute the scores with the digital values.

9. The semiconductor integrated circuit according to claim 1, further comprising
a plurality of delay circuits that are arranged between the decision circuit and the determination circuit and configured to delay the selected bit value.

10. The semiconductor integrated circuit according to claim 9, wherein
a first delay circuit among the plurality of delay circuits is configured to give a delay amount to the selected bit value, a second delay circuit among the plurality of delay circuits is configured to give a delay amount to a bit value in which the delay amount has been given to the selected bit value, the bit value to which the delay amount has been given by the first delay circuit is output to the determination circuit and the second delay circuit as a first decision result, and the bit value to which the delay amount has been given by the second delay circuit is output to the determination circuit as a second decision result.

11. The semiconductor integrated circuit according to claim 1, wherein the determination circuit is configured to output an analog signal that controls a gain to the arithmetic circuit according to the plurality of indexes, and the arithmetic circuit is configured to:

multiply each of the current output values by the gain, and compute the scores with an analog signal by adding the current output values multiplied by the gain.

12. The semiconductor integrated circuit according to claim 11, wherein the sampler unit includes, as the plurality of sampler circuits, a first sampler circuit having a first threshold, a second sampler circuit having a second threshold greater than the first threshold, and a third sampler circuit having a third threshold smaller than the first threshold, a difference between the second threshold and the first threshold is equal to a difference between the first threshold and the third threshold, and the arithmetic circuit includes:

a first variable multiplication circuit electrically connected to an output node of the first sampler circuit;

a second variable multiplication circuit electrically connected to an output node of the second sampler circuit;

a third variable multiplication circuit electrically connected to an output node of the third sampler circuit; and a summer circuit electrically connected to an output node of the first variable multiplication circuit, an output node of the second variable multiplication circuit, and an output node of the third variable multiplication circuit.

13. The semiconductor integrated circuit according to claim 12, wherein the first variable multiplication circuit is configured to multiply a first sampling result corresponding to a logic value output from the first sampler circuit by the analog signal output from the determination circuit as the gain, the second variable multiplication circuit is configured to multiply a second sampling result corresponding to a logic value output from the second sampler circuit by the analog signal output from the determination circuit as the gain, and the third variable multiplication circuit is configured to multiply a third sampling result corresponding to a logic value output from the third sampler circuit by the analog signal output from the determination circuit as the gain.

14. The semiconductor integrated circuit according to claim 11, wherein the decision circuit is further configured to:

compare the score with a reference voltage, select 1 as the bit value of the current data signal when the score is greater than the reference voltage, and select 0 as the bit value of the current data signal when the score is smaller than the reference voltage.

15. A receiving apparatus comprising:

the semiconductor integrated circuit according to claim 1; and a circuit configured to receive data output from the semiconductor integrated circuit.

16. The receiving apparatus according to claim 15, wherein the sampler unit includes, as the plurality of sampler circuits, a first sampler circuit having a first threshold, a second sampler circuit having a second threshold greater than the first threshold, and a third sampler circuit having a third threshold smaller than the first threshold, and a difference between the second threshold and the first threshold is equal to a difference between the first threshold and the third threshold.

17. The receiving apparatus according to claim 15, wherein the arithmetic circuit is configured to compute the scores by adding the determined indexes according to the current output values for each of the plurality of candidate bit values.

18. The receiving apparatus according to claim 17, wherein the determination circuit is configured to output the plurality of indexes as digital values to the arithmetic circuit, and the arithmetic circuit is further configured to compute the scores with the digital values.

19. The receiving apparatus according to claim 15, further comprising a plurality of delay circuits that are arranged between the decision circuit and the determination circuit and configured to delay the selected bit value.

20. The receiving apparatus according to claim 15, wherein the determination circuit is configured to output an analog signal that controls a gain to the arithmetic circuit according to the plurality of indexes, and the arithmetic circuit is configured to:

multiply each of the current output values by the gain, and compute the scores with an analog signal by adding the current output values multiplied by the gain.

* * * * *